US012025158B1

(12) United States Patent
Cheng et al.

(10) Patent No.: US 12,025,158 B1
(45) Date of Patent: Jul. 2, 2024

(54) FLOW SELF-COMPENSATING LOAD SENSING PUMP/VALVE COORDINATED ELECTRO-HYDRAULIC SYSTEM AND CONTROL METHOD

(71) Applicants: Chongqing University, Chongqing (CN); East China Jiaotong University, Nanchang (CN)

(72) Inventors: Min Cheng, Chongqing (CN); Jingbo He, Chongqing (CN); Ruqi Ding, Jiangxi (CN); Bolin Sun, Chongqing (CN)

(73) Assignees: Chongqing University, Chongqing (CN); East China Jiaotong University, Jiangxi (CN)

(*) Notice: Subject to any disclaimer, the term of this patent is extended or adjusted under 35 U.S.C. 154(b) by 0 days.

(21) Appl. No.: 18/532,878

(22) Filed: Dec. 7, 2023

(30) Foreign Application Priority Data

Dec. 8, 2022 (CN) ........................ 202211579576.9

(51) Int. Cl.
*F15B 11/042* (2006.01)
*F15B 11/16* (2006.01)
*F15B 13/04* (2006.01)

(52) U.S. Cl.
CPC ........ *F15B 11/0423* (2013.01); *F15B 11/163* (2013.01); *F15B 11/165* (2013.01);
(Continued)

(58) Field of Classification Search
CPC ... F15B 11/0423; F15B 11/163; F15B 11/165; F15B 2211/45; F15B 2211/6054
(Continued)

(56) References Cited

U.S. PATENT DOCUMENTS 4,468,173 A * 8/1984 Dantlgraber ............ F04B 49/08 417/220
5,394,697 A * 3/1995 Hirata ................... E02F 9/2235 60/426

(Continued)

FOREIGN PATENT DOCUMENTS

CN 208185091 U 12/2018

OTHER PUBLICATIONS

Chinese First Office Action with English Translation, Application Patent No. 202211579576.9, Issue No. 2023052500046540, Applicant: Chongqing University, East China Jiaotong University, Title: Flow self-compensation load-sensitive pump valve coordination electro-hydraulic system and control method, Date: May 25, 2023.

(Continued)

*Primary Examiner* — Michael Leslie
(74) *Attorney, Agent, or Firm* — Reising Ethington P.C.

(57) ABSTRACT

The disclosure provides a flow self-compensating load sensing pump/valve coordinated electro-hydraulic system, including a prime mover, an electronically controlled variable pump, a flow control valve, a hydraulic actuator, a shuttle valve, an electronic control joystick, a bypass control valve, two pressure sensors, a bypass throttle valve, and a control system, where an oil outlet of the shuttle valve is connected to a right spring chamber of the bypass control valve, a left chamber and an oil inlet of the bypass control valve are connected to an oil outlet of the electronically controlled variable pump, an oil inlet and an oil outlet of the bypass throttle valve are connected to an oil outlet of the bypass control valve and an oil tank, two ends of the oil inlet and the oil outlet of the bypass throttle valve are provided with the first pressure sensor and the second pressure sensor, respectively.

9 Claims, 8 Drawing Sheets

(52) U.S. Cl.
CPC . *F15B 13/0417* (2013.01); *F15B 2211/20546* (2013.01); *F15B 2211/40507* (2013.01); *F15B 2211/40515* (2013.01); *F15B 2211/45* (2013.01); *F15B 2211/6054* (2013.01); *F15B 2211/6306* (2013.01); *F15B 2211/6309* (2013.01); *F15B 2211/6346* (2013.01)

(58) Field of Classification Search
USPC .......................................... 60/422, 452, 468
See application file for complete search history.

(56) References Cited

U.S. PATENT DOCUMENTS

| | | | | | |
|---|---|---|---|---|---|
| 5,873,245 | A * | 2/1999 | Kato | E02F 9/2225 60/452 |
| 6,976,357 | B1 * | 12/2005 | Pfaff | F15B 21/087 60/445 |
| 8,875,506 | B2 * | 11/2014 | Hennemann | E02F 9/2228 60/443 |
| 10,895,059 | B2 * | 1/2021 | Misaki | E02F 3/32 |

OTHER PUBLICATIONS

Notification to Grant Patent Right for Invention with English Translation, Application No. 202211579576.9, Issue No. 2023060800136990, Applicant: Chongqing University, East China Jiaotong University , Title: Flow self-compensation load-sensitive pump valve coordination electro-hydraulic system and control method.

* cited by examiner

FLOW SELF-COMPENSATING LOAD SENSING PUMP/VALVE COORDINATED ELECTRO-HYDRAULIC SYSTEM AND CONTROL METHOD

CROSS REFERENCE TO RELATED APPLICATION

This patent application claims the benefit and priority of Chinese Patent Application No. 202211579576.9, filed with the China National Intellectual Property Administration on Dec. 8, 2022, the disclosure of which is incorporated by reference herein in its entirety as part of the present application.

TECHNICAL FIELD

The present disclosure belongs to the field of hydraulic transmission and control technologies, and in particular, to a flow self-compensating load sensing pump/valve coordinated control electro-hydraulic system and a control method.

BACKGROUND

The load sensing technology is one of the most widely used energy saving methods for hydraulic control systems of construction, agriculture, forestry, environmental sanitation, and the like equipment. In this technology, a pressure feedback principle is used to feedback load pressure to a variable pump control valve through a long pipe. This achieves system flow supply and demand balance through pressure margin (the difference between system pressure and maximum load pressure) closed-loop control, reducing energy losses and system heating.

However, the conventional load sensing system adopts a "hydro-mechanical" feedback control principle, and there are two disadvantages: On the one hand, for a preset pressure margin of the conventional load sensing system, it needs to consider local pressure losses at different flows and different temperatures, and the set value is very conservative (usually, 2.0 MPa to 2.8 MPa). This seriously affects energy utilization efficiency. On the other hand, pressure oil with maximum load is fed back to a spring chamber of a load sensing valve of a hydraulic pump through a complex shuttle valve network and a long hydraulic pipe. There are disadvantages, such as low stability margin, response delay, and easy oscillation, seriously affecting system operation performance and operation efficiency.

In an existing solution, an electro-hydraulic flow matching system using pump-valve synchronization control can basically eliminate a phenomenon of pump lagging valve control in the conventional load sensing system, and consider both energy reducing and operation performance. However, the problem of the system is that when a pump output flow is greater than a load demand flow, the system may cause pressure impact and energy losses due to overflow matching, reducing system energy utilization efficiency. Therefore, the problem that needs to be resolved in the present disclosure is how to avoid system overflow matching, precisely control the displacement of the hydraulic pump to better match the required flow of a hydraulic actuator, and improve system energy utilization efficiency.

SUMMARY

To resolve the above technical problem, technical solutions used in the present disclosure provide a flow self-compensating load sensing pump/valve coordinated electro-hydraulic system and a control method, to resolve a problem mentioned in the foregoing background art that pressure impact and energy losses are caused by the system due to overflow matching.

To achieve the foregoing objective, the present disclosure provides the following technical solutions: A flow self-compensating load sensing pump/valves coordinated electro-hydraulic system includes a prime mover, an electronically controlled variable pump, a flow control valve, and a hydraulic actuator, where the prime mover is configured to drive the electronically controlled variable pump, an oil outlet of the electronically controlled variable pump is connected to an oil inlet of the flow control valve, an oil outlet of the flow control valve is connected to an oil inlet of the hydraulic actuator, and an oil outlet of the hydraulic actuator is connected to an oil tank. The control system further includes a shuttle valve, an electronic control joystick, a bypass control valve, a first pressure sensor, a second pressure sensor, a bypass throttle valve, and a control system, where the shuttle valve is configured to screen out a maximum load pressure of the hydraulic actuator, an oil outlet of the shuttle valve is connected to a right spring chamber of the bypass control valve, a left chamber and an oil inlet of the bypass control valve are both connected to the oil outlet of the electronically controlled variable pump, an oil outlet of the bypass control valve is connected to an oil inlet of the bypass throttle valve, an oil outlet of the bypass throttle valve is connected to the oil tank, the oil inlet and the oil outlet of the bypass throttle valve are correspondingly provided with the first pressure sensor and the second pressure sensor, the electronic control joystick is connected to a control end of the flow control valve and the control system, the control system generates a control signal of the electronically controlled variable pump by receiving a control signal of the electronic control joystick and pressure signals of the first pressure sensor and the second pressure sensor, and the control signal of the electronically controlled variable pump is transmitted to the electronically controlled variable pump.

Further, the control system further includes a throttle valve and a damping valve, where an oil inlet of the throttle valve is connected to the hydraulic actuator, an oil outlet of the throttle valve is connected to the oil tank, a control end of the throttle valve is connected to the electronic control joystick, the oil outlet of the shuttle valve is connected to the right spring chamber of the bypass control valve by using the damping valve, and the left chamber of the bypass control valve is connected to the oil outlet of the electronically controlled variable pump by using the damping valve.

Further, the flow control valve is a hydro-mechanical flow control valve including a pressure compensator valve and a proportional directional valve or an electronic flow control valve controlled by using an algorithm.

Further, the control system includes a mapping module of a joystick control signal and a feedforward flow, a mapping module of a bypass throttle valve pressure difference and overflowing flow, a low-pass filter, a closed-loop feedback controller, and a mapping module of a flow and a pump control signal.

Further, the prime mover is an electric motor or an engine.

Further, the hydraulic actuator is a hydraulic linear cylinder or a hydraulic rotary motor.

The present disclosure further provides a control method applied to the flow self-compensating load sensing pump/valve coordinated electro-hydraulic system, including the following:

Step 1: An electronic control joystick transmits a control signal to the control system, and the control system calculates a flow feedforward demand signal of a hydraulic system.

Step 2: A first pressure sensor and a second pressure sensor at two ends of a bypass throttle valve transmit acquired pressure signals to the control system, and the control system calculates a pressure difference between the two ends of the bypass throttle valve by using the pressure signals, and calculates, by using a pressure difference signal, a flow feedback compensation signal passing through the bypass throttle valve, where the flow feedback compensation signal is output after being sequentially processed by the control system.

Step 3: Make a difference between the flow feedforward demand signal of the hydraulic system and the flow feedback compensation signal, and transmit the difference to the control system as a demand signal of an actual flow of the hydraulic system; and the control system converts the demand signal of the actual flow of the hydraulic system into a displacement control signal of an electronically controlled variable pump.

Step 4: Use the displacement control signal of the electronically controlled variable pump to adjust a position of a variable piston by using a flow control valve, to further adjust a swing angle of a swash plate, so as to precisely control the electronically controlled variable pump.

The present disclosure further provides another flow self-compensating load sensing pump/valve coordinated electro-hydraulic system, including a prime mover, an electronically controlled variable pump, N flow control valves, and N hydraulic actuators, where the prime mover is configured to drive the electronically controlled variable pump, an oil outlet of the electronically controlled variable pump is connected to an oil inlet of each of the N flow control valves, an oil outlet of each flow control valve is connected to an oil inlet of one hydraulic actuator, and an oil outlet of each of the N hydraulic actuators is connected to an oil tank. The control system further includes a shuttle valve group, N electronic control joysticks, a bypass control valve, a first pressure sensor, a second pressure sensor, a bypass throttle valve, and a control system, where the shuttle valve group includes (N−1) shuttle valves; a first shuttle valve is connected to both a neighboring first hydraulic actuator and a second hydraulic actuator, to screen out a maximum load pressure in those of the first hydraulic actuator and the second hydraulic actuator; the first shuttle valve outputs, by using an oil outlet, the maximum load pressure in those of the first hydraulic actuator and the second hydraulic actuator to one end of an oil inlet of a second shuttle valve; the other end of the oil inlet of the second shuttle valve is connected to an oil inlet of a third hydraulic actuator, to screen out a maximum load pressure in those of the three hydraulic actuators, and by analogy, the shuttle valve group screens out a maximum load pressure in those of the N hydraulic actuators; an oil outlet of each of the (N−1) shuttle valves is connected to a right spring chamber of the bypass control valve; a left chamber and an oil inlet of the bypass control valve are both connected to the oil outlet of the electronically controlled variable pump; an oil outlet of the bypass control valve is connected to an oil inlet of the bypass throttle valve; an oil outlet of the bypass throttle valve is connected to the oil tank; the oil inlet and the oil outlet of the bypass throttle valve are correspondingly provided with the first pressure sensor and the second pressure sensor; each electronic control joystick is correspondingly connected to a control end of one flow control valve; the N electronic control joysticks are further connected to the control system; the control system generates a control signal of the electronically controlled variable pump by receiving control signals of the N electronic control joysticks and pressure signals of the first pressure sensor and the second pressure sensor; and the control signal of the electronically controlled variable pump is transmitted to the electronically controlled variable pump.

Further, the control system further includes a throttle valve and a damping valve, where an oil inlet of the throttle valve is connected to each of the hydraulic actuators, an oil outlet of the throttle valve is connected to the oil tank, a control end of the throttle valve is connected to each of the electronic control joysticks, the oil outlet of each of the (N−1) shuttle valves is connected to the right spring chamber of the bypass control valve by using the damping valve, and the left chamber of the bypass control valve is connected to the oil outlet of the electronically controlled variable pump by using the damping valve.

Further, the flow control valve is a hydro-mechanical flow control valve including a pressure compensator valve and a proportional directional valve.

Compared with the conventional technology, the present disclosure has the following beneficial effects:

1. In the present disclosure, the difference between the flow feedforward demand signal of the electronic control joystick and a flow feedback control signal passing through the bypass control valve is used as an actual demand flow signal of the system, which is further converted into the control signal of the electronically controlled variable pump by using a pump flow mapping module. This better resolves a problem of precise matching between a displacement of a hydraulic pump and a flow required by the hydraulic actuator, reduces a pressure surge and energy losses of the entire system, reduces a pressure margin and a response time of the system, improves pressure controllability and damping performance, further reduces a load oscillation speed of the system, and improves system energy efficiency and control performance.
2. In the present disclosure, the low-pass filter in the control system filters out pressure signal noise generated by high-frequency interference, thereby preventing the bypass control valve from automatically opening due to fluctuations in pressures at a pump outlet.
3. In comparison with detecting a flow by using a flowmeter, in the present disclosure, by using the pressure signals acquired by the pressure sensors at the two ends of the bypass throttle valve, a software system calculates, when system overflow matching occurs, a flow effused by using the bypass control valve, greatly reducing costs.

REFERENCE NUMERALS IN FIG. 10

331—Bypass feedback flow
332—Feedforward flow of a joystick
333—Closed-loop feedback controller

DETAILED DESCRIPTION OF THE EMBODIMENTS

To make the objective, technical solutions, and advantages of the present disclosure clearer, the technical solutions in this application are clearly and completely described below with reference to specific embodiments and corresponding accompanying drawings of this application. Those skilled in the art can easily understand other advantages and effects of the present disclosure from the content disclosed in this specification. The present disclosure can also be implemented or applied through other different specific implementations. Based on different viewpoints and applications, various modifications or amendments can be made to various details of this specification without departing from the spirit of the present disclosure. It should be noted that the diagrams provided in the following embodiments merely illustrate the basic conception of the present disclosure only schematically, and the following embodiments or features in the embodiments may be combined in a non-conflicting manner.

The accompanying drawings are schematic diagrams rather than physical diagrams, which are only for illustrative description and should not be construed as a limitation to the present disclosure. In order to better describe the embodiments of the present disclosure, some components may be omitted, enlarged or reduced in the accompanying drawings, and thus do not represent true sizes of physical products. Those skilled in the art should understand that some well-known structures and descriptions thereof may be omitted in the accompanying drawings.

Embodiment 1

Figure 1:
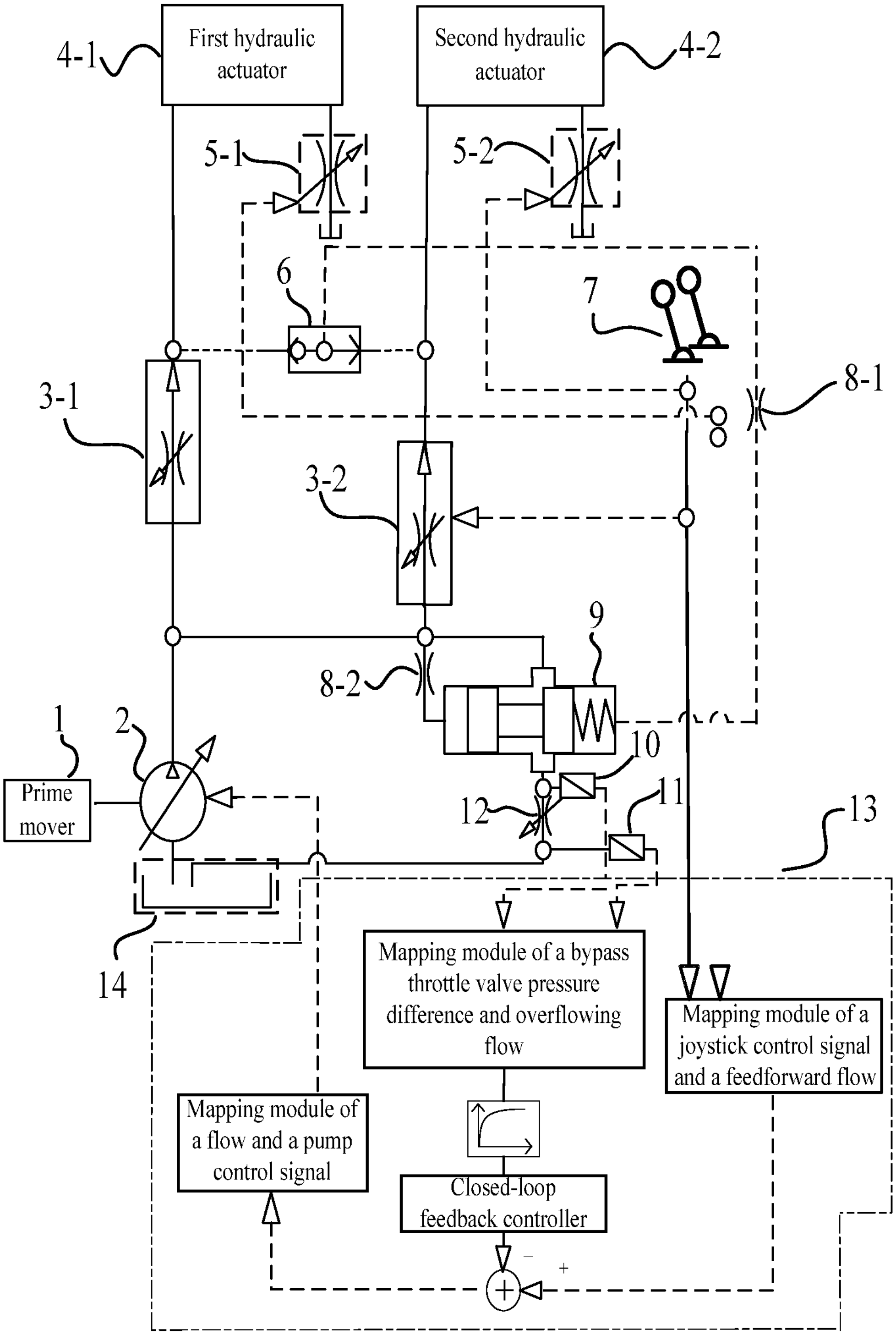
FIG. 1 is a schematic diagram of a system principle of Embodiment 1 of a flow self-compensating load sensing pump/valve coordinated electro-hydraulic system according to the present disclosure.

Referring to FIG. 1, a flow self-compensating load sensing pump/valve coordinated electro-hydraulic system includes a prime mover 1, an electronically controlled variable pump 2, a first flow control valve 3-1, a second flow control valve 3-2, a first hydraulic actuator 4-1, a second hydraulic actuator 4-2, a first throttle valve 5-1, a second throttle valve 5-2, a shuttle valve 6, two electronic control joysticks 7, a first damping valve 8-1, a second damping valve 8-2, a bypass control valve 9, a first pressure sensor 10, a second pressure sensor 11, a bypass throttle valve 12, a control system 13, an oil tank 14. An oil outlet of the electronically controlled variable pump 2 is connected to oil inlets of the first flow control valve 3-1 and the second flow control valve 3-2. Oil outlets of the first flow control valve 3-1 and the second flow control valve 3-2 are correspondingly connected to the first hydraulic actuator 4-1 and the second hydraulic actuator 4-2. The electronically controlled variable pump 2 supplies hydraulic oil to the first hydraulic actuator 4-1 and the second hydraulic actuator 4-2 respectively by using the first flow control valve 3-1 and the second flow control valve 3-2.

Oil outlets of the first hydraulic actuator 4-1 and the second hydraulic actuator 4-2 are correspondingly connected to oil inlets of the first throttle valve 5-1 and the second throttle valve 5-2. Oil outlets of the first throttle valve 5-1 and the second throttle valve 5-2 are both connected to the oil tank 14. Left and right ends of the shuttle valve 6 are correspondingly connected to oil inlets of the first hydraulic actuator 4-1 and the second hydraulic actuator 4-2. The shuttle valve 6 is configured to screen out a maximum load pressure in those of the first hydraulic actuator 4-1 and the second hydraulic actuator 4-2, and feedback the maximum load pressure to the right spring chamber of the bypass control valve 9 by using the first damping valve 8-1. The left chamber of the bypass control valve 9 is connected to the oil outlet of the electronically controlled variable pump 2 by using the second damping valve 8-2.

An oil outlet of the bypass control valve 9 is connected to an oil inlet of the bypass throttle valve 12. An oil outlet of the bypass throttle valve 12 is connected to the oil tank 14. The oil inlet and the oil outlet of the bypass throttle valve 9 are correspondingly provided with the first pressure sensor 10 and the second pressure sensor 11. One of the two electronic control joysticks 7 is connected to the first flow control valve 3-1, a control end of the first throttle valve 5-1, and the control system 13. The other of the two electronic control joysticks 7 is connected to the second flow control valve 3-2, a control end of the second throttle valve 5-2, and the control system 13. The control system 13 generates a control signal of the electronically controlled variable pump by receiving control signals of the two electronic control joysticks 7 and pressure signals of the first pressure sensor 10 and the second pressure sensor 11. The control signal of the electronically controlled variable pump is transmitted to the electronically controlled variable pump 2 for further adjusting the swing angle of the swash plate, so as to precisely control the displacement of the electronically controlled variable pump 2.

In this embodiment, the prime mover 1 may be one of an electric motor or an engine. The first flow control valve 3-1 and the second flow control valve 3-2 each may be either a hydro-mechanical flow control valve including a pressure compensator valve and a proportional directional valve, or a flow control valve controlled by using an electronic algorithm. The first hydraulic actuator 4-1 and the second hydraulic actuator 4-2 each may be a hydraulic linear cylinder or a hydraulic rotary motor. The control system 13 is an industrial computer or a single-chip microcomputer.

Figure 2:
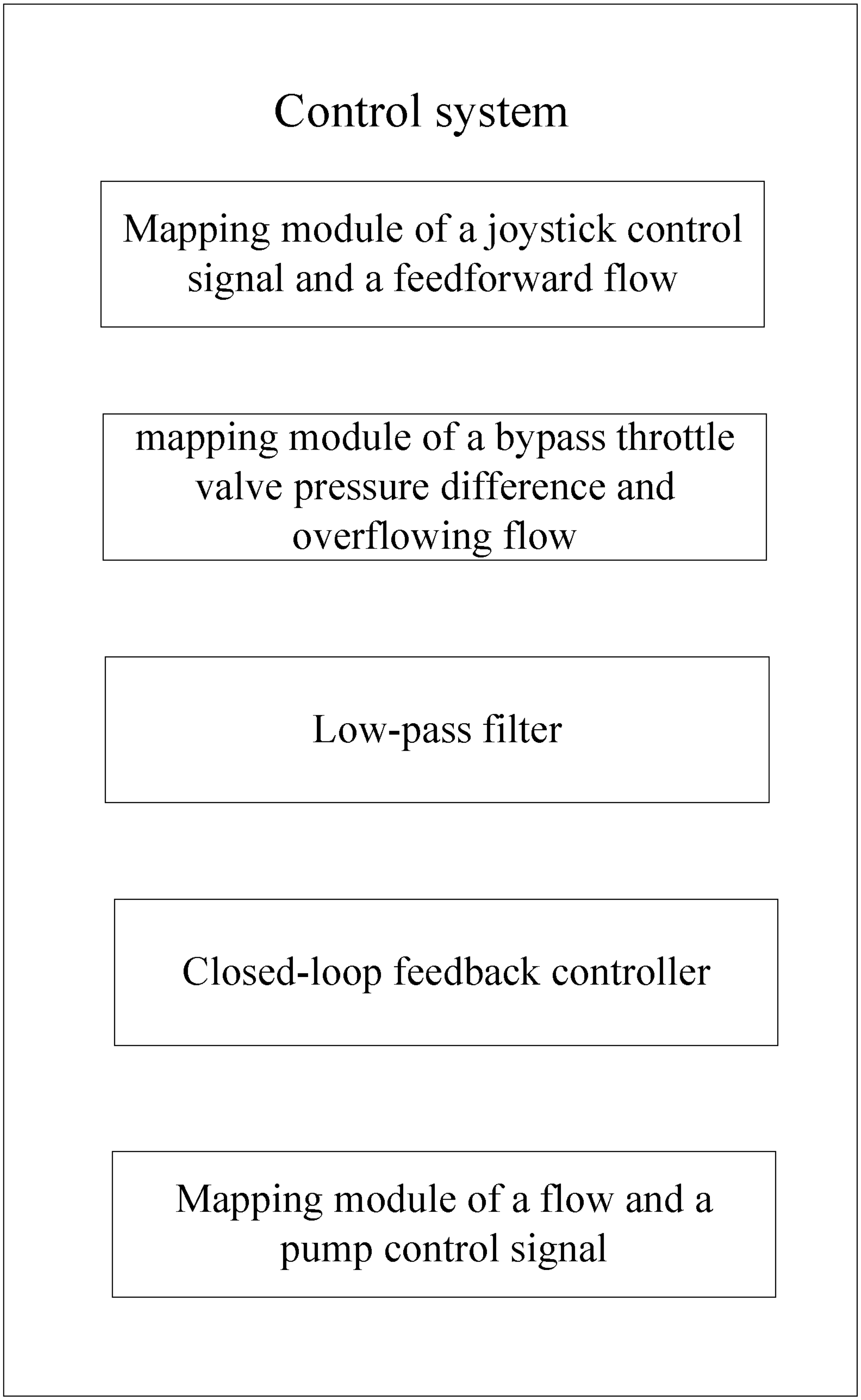
FIG. 2 is a schematic block diagram of a control system in FIG. 1.

Specifically, as shown in FIG. 2, the control system 13 includes a mapping module of a joystick control signal and a feedforward flow, a mapping module of a bypass throttle valve pressure difference and overflowing flow, a low-pass filter, a closed-loop feedback controller, and a mapping module of a flow and a pump control signal. The low-pass filter and the closed-loop feedback controller in the control system 13 process the flow signal of the flow effused by using the bypass control valve 9. This can not only filter out pressure signal noise generated by high-frequency interference and prevent the bypass control valve from automatically opening due to fluctuations in flows at the pump outlet, but also improve responsiveness and stability of the system.

Figure 3:
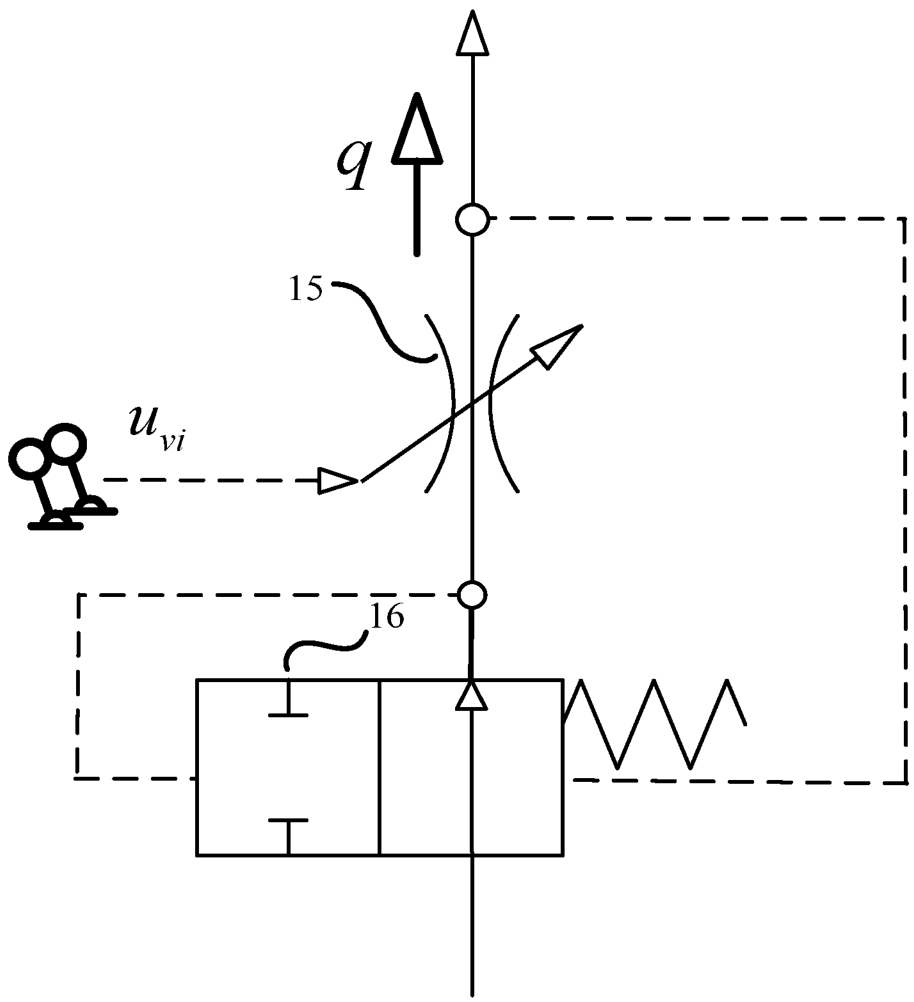
FIG. 3 shows a hydro-mechanical flow control valve including a pressure compensator valve and a proportional directional valve.

Further, refer to FIG. 3. FIG. 3 is a schematic diagram of a first flow control valve 3-1 and a second flow control valve 3-2 in a flow self-compensating load sensing pump/valve coordinated electro-hydraulic system according to the present disclosure. The first flow control valve 3-1 and the second flow control valve 3-2 each is a hydro-mechanical flow control valve including a pressure compensator valve 16 and a proportional directional valve 15. In the first flow control valve 3-1 and the second flow control valve 3-2, a corresponding electronic control joystick 7 provides a desired signal to the proportional directional valve 15, to control the system flow by controlling an opening degree of the proportional directional valve 15. When the pressure after the proportional directional valve 15 varies with load, the pressure compensator valve 16 installed in front of the proportional directional valve 15 may control, by changing the position of the valve core of the pressure compensator valve 16, the flow passing through the pressure compensator valve 16. Under the combined action of the pressure compensator valve 16 and the proportional directional valve 15, flows supplied by the electronically controlled variable pump 2 to the first hydraulic actuator 4-1 and the second hydraulic actuator 4-2 can be controlled.

Figure 4:
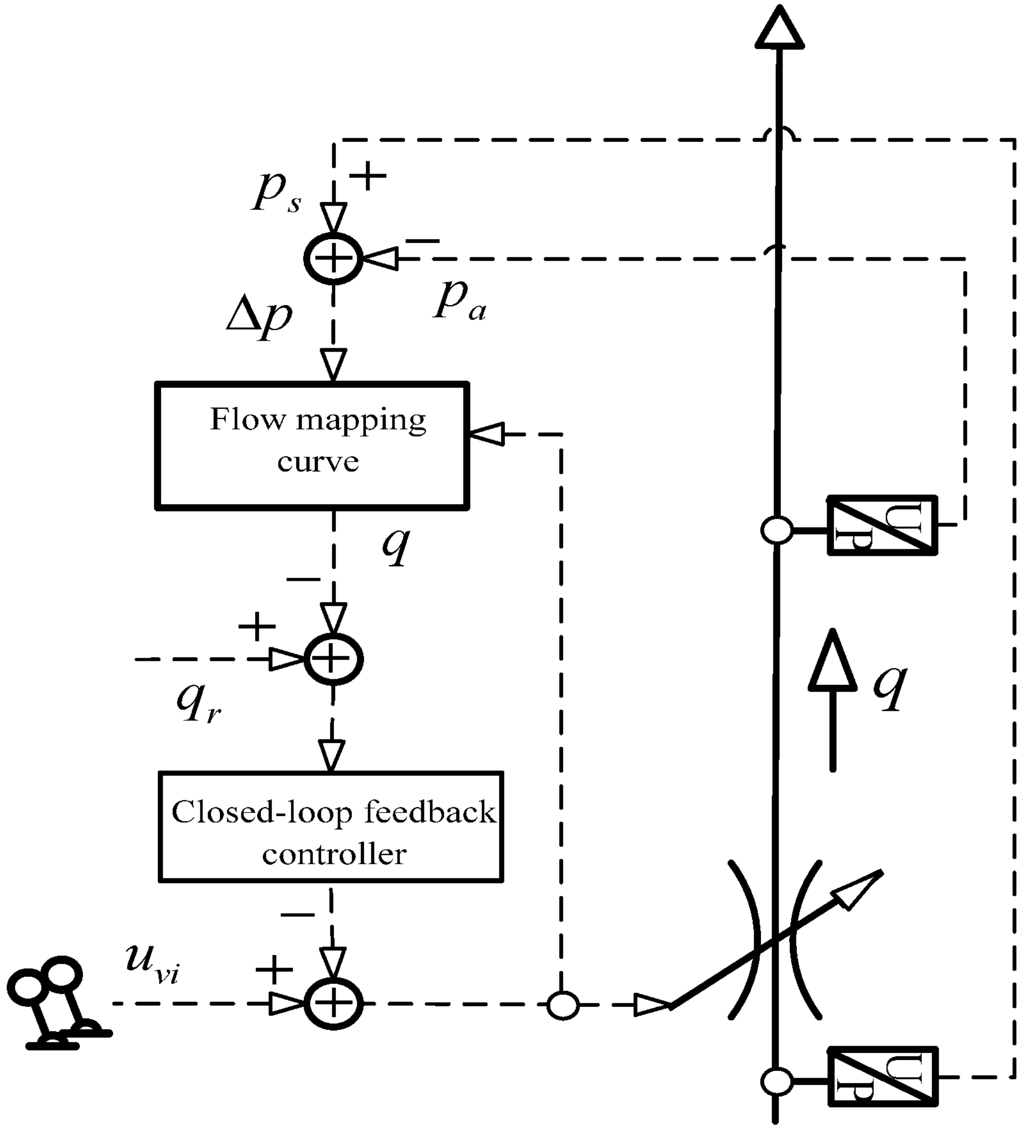
FIG. 4 shows a flow control valve controlled by using an electronic algorithm.

FIG. 4 is a schematic diagram of a first flow control valve 3-1 and a second flow control valve 3-2 that are controlled by using an electronic algorithm in a flow self-compensating load sensing pump/valve coordinated electro-hydraulic system according to the present disclosure. In the first flow control valve 3-1 and the second flow control valve 3-2, two pressure sensors are respectively installed before and after the proportional directional valve. The pressure difference signal before and after the proportional directional valve is calculated by using the pressure sensors. The pressure difference signal is calculated by using a flow mapping curve to obtain the flow signal passing through the proportional directional valve. The flow signal and an desired flow signal are output after being processed by the closed-loop feedback controller, to adjust the control signal of the proportional directional valve. Therefore, flows supplied by the electronically controlled variable pump 2 to the first hydraulic actuator 4-1 and the second hydraulic actuator 4-2 are controlled.

Figure 5:
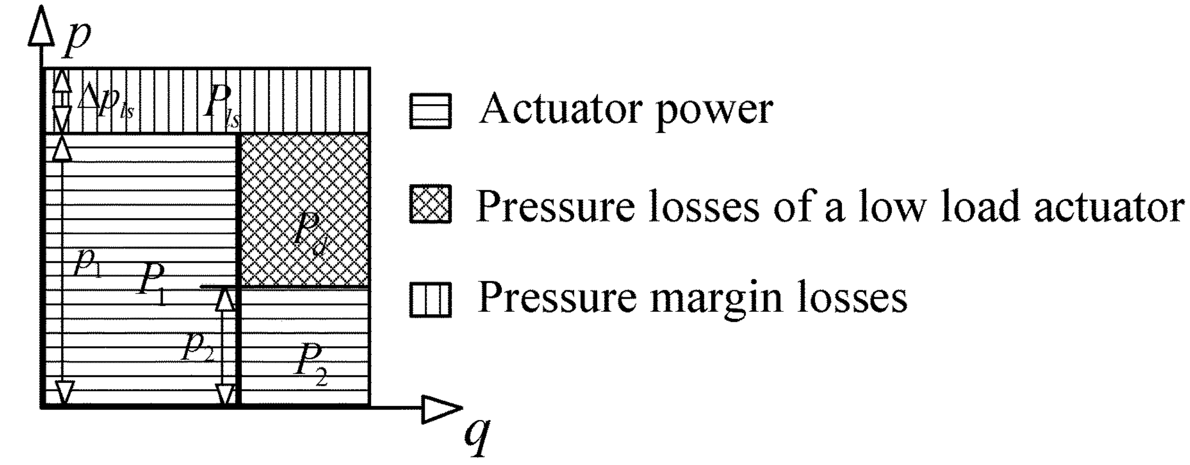
FIG. 5 is a characteristic diagram of energy consumption of a conventional load sensing system.
Figure 6:
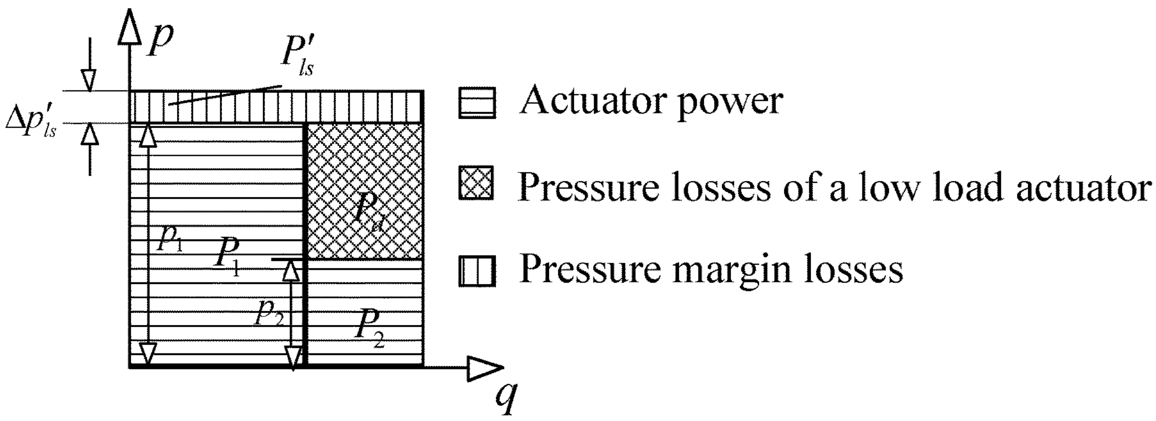
FIG. 6 is a characteristic diagram of energy consumption obtained when the feedforward computation flow of a joystick just meets or is not sufficient to meet a flow required by load according to the present disclosure.
Figure 7:
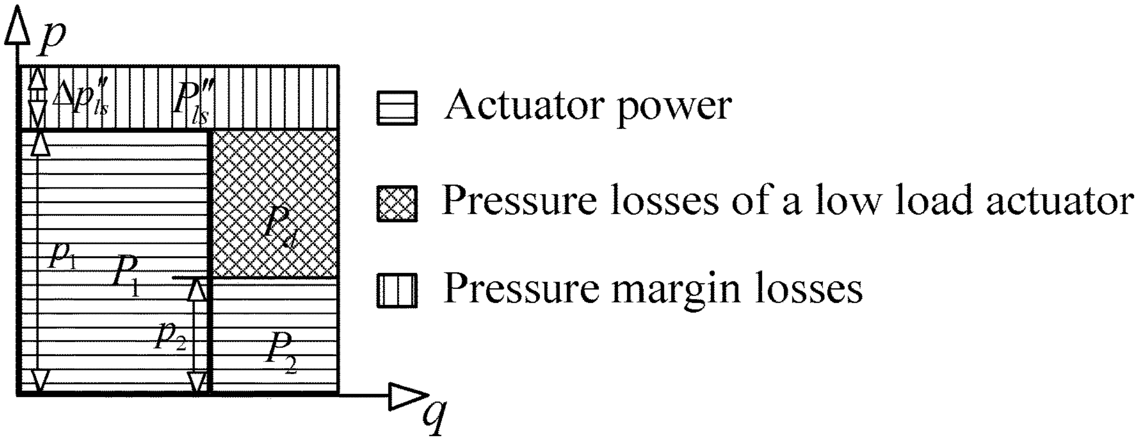
FIG. 7 is a characteristic diagram of energy consumption obtained when the feedforward computation flow of a joystick exceeds a flow required by load according to the present disclosure.

FIG. 5 is a characteristic diagram of energy consumption of a conventional load sensing system. The conventional load sensing system has no bypass flow detection system for adjustment. Consequently, the pressure margin of the conventional load sensing system does not change under any working conditions. FIG. 6 is a characteristic diagram of energy consumption obtained when the feedforward flow of a joystick is insufficient according to the present disclosure. When the supply flow of a hydraulic pump fails to meet the demand flow of the hydraulic actuator, the pressure margin of the system automatically adapts to local pressure drops in a pipeline, a connector, and another location. This value is much lower than a relatively conservative pressure drop value preset by the load sensing system. Therefore, the pressure margin of the system obviously decreases (that is, $\Delta p'_{ls}<\Delta p_{ls}$), and energy consumption of the system is also significantly reduced. FIG. 7 is a characteristic diagram of energy consumption obtained when there are too many feedforward flows of a joystick according to the present disclosure. When the supply flow of the electronically controlled variable pump 2 is greater than the maximum demand flow in those of the first hydraulic actuator 4-1 and the second hydraulic actuator 4-2, the displacement of the hydraulic pump is adjusted by using the control system 13 in the embodiment in FIG. 1. In this way, the flow passing through the bypass control valve 9 can be basically reduced to zero. Therefore, when feedforward flows of the electronic control joystick 7 are excessive, the pressure margin of the flow self-compensating load sensing pump/valve coordinated electro-hydraulic system can be considered as basically consistent with the pressure margin of the conventional load sensing system (that is, $\Delta p''_{ls}\sim\Delta p_{ls}$). It may be clearly learned from FIG. 5, FIG. 6, and FIG. 7 that, in the flow self-compensating load sensing pump/valve coordinated electro-hydraulic system described in the present disclosure, the pressure margin of the flow self-compensating load sensing pump/valve coordinated electro-hydraulic system is lower than the existing system.

To obtain expected speeds of the first hydraulic actuator 4-1 and the second hydraulic actuator 4-2 by controlling the displacement of the electronically controlled variable pump 2, the electronically controlled variable pump 2 needs to provide the determined hydraulic oil flow. However, there are uncertain factors in the hydraulic system such as rotation speed, temperature, leakage and other parameters. This makes it is difficult to precisely dynamically match the flow of the pump and valves. In this case, the flow matching problem cannot be well resolved only by using the desired signals adjusted by the electronic control joystick 7. In this embodiment, there is a difference between a feedforward flow expected signal generated by the electronic control joystick 7 and a flow feedback compensation signal of the flow effused by using the bypass control valve 9. The control system 13 uses the difference as the control signal of the electronically controlled variable pump 2 after the difference is converted by using a flow mapping module of the electronically controlled variable pump. This better resolves the problem of precise matching between supply and demand flows of a single pump with multiple actuators, reduces the pressure surge and energy losses of the entire system, reduces the pressure margin and response time of the system, improves pressure controllability and damping performance, further reduces the load oscillation speed of the system, and improves system energy efficiency and control performance.

Figure 8:
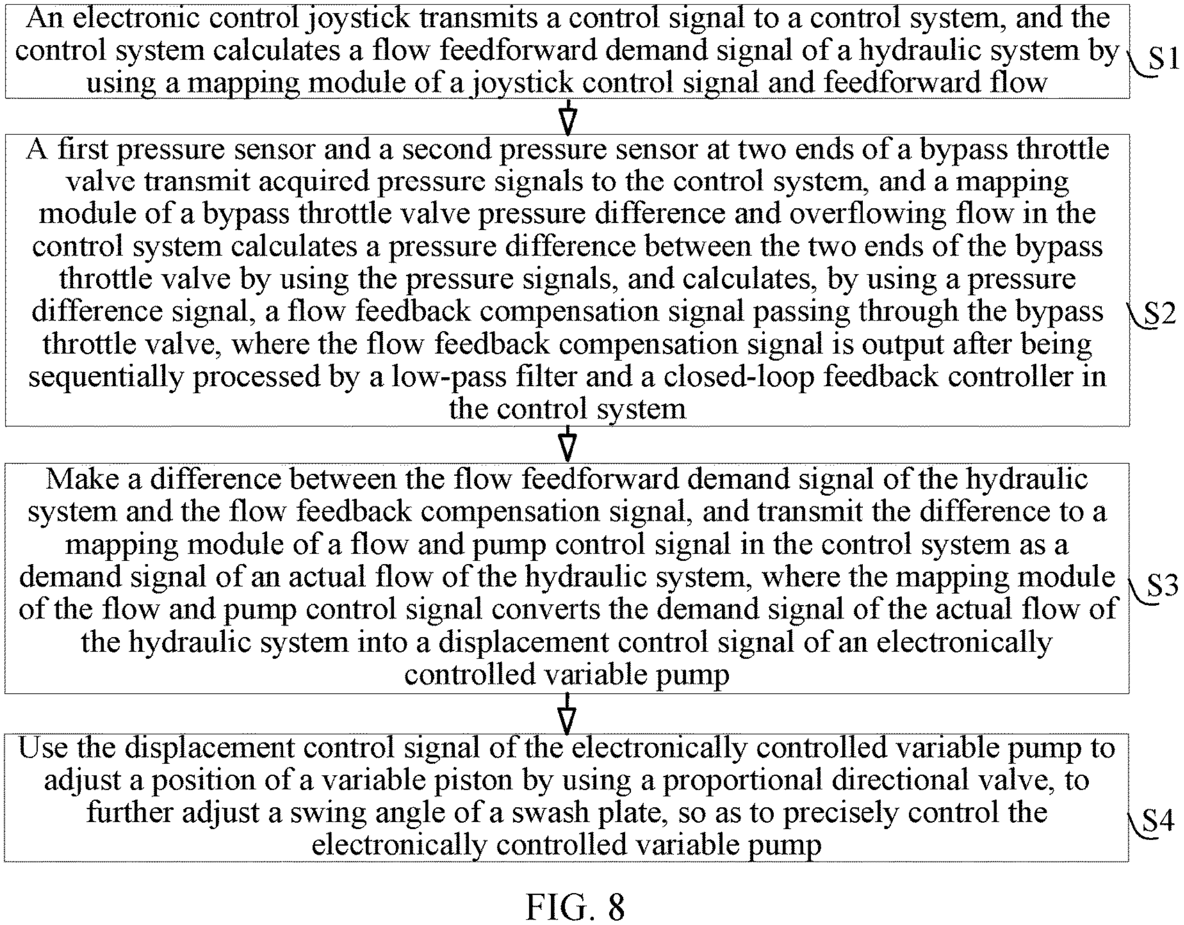
FIG. 8 is a schematic flowchart of a preferred implementation of a control method of a flow self-compensating load sensing pump/valve coordinated electro-hydraulic system according to the present disclosure.

As shown in FIG. 8, the present disclosure further provides a control method of the flow self-compensating load sensing pump/valve coordinated electro-hydraulic system, including the following:

Step S1: The electronic control joystick 7 transmits a control signal to the control system 13, and the control system 13 calculates a flow feedforward demand signal of the hydraulic system by using a mapping module of the joystick control signal and feedforward flow.

Step S2: The first pressure sensor 10 and the second pressure sensor 11 at two ends of the bypass throttle valve 12 transmit acquired pressure signals to the control system 13, and the mapping module of the bypass throttle valve pressure difference and overflowing flow in the control system 13 calculates a pressure difference between the two ends of the bypass throttle valve 12 by using the pressure signals, and calculates, by using the pressure difference signal, the flow feedback compensation signal passing through the bypass throttle valve 12, where the flow feedback compensation signal is output after being sequentially processed by the low-pass filter and the closed-loop feedback controller in the control system 13.

Step S3: Make a difference between the flow feedforward demand signal of the hydraulic system and the flow feedback compensation signal, and transmit the difference to the mapping module of the flow and pump control signal in the control system as the demand signal of an actual flow of the hydraulic system, where the mapping module of the flow and pump control signal converts the demand signal of the actual flow of the hydraulic system into the displacement control signal of the electronically controlled variable pump 2.

Step S4: Use the displacement control signal of the electronically controlled variable pump 2 to adjust the position of the variable piston by using the proportional directional valve, to further adjust the swing angle of the swash plate, so as to precisely control the electronically controlled variable pump 2.

Embodiment 2

Figure 9:
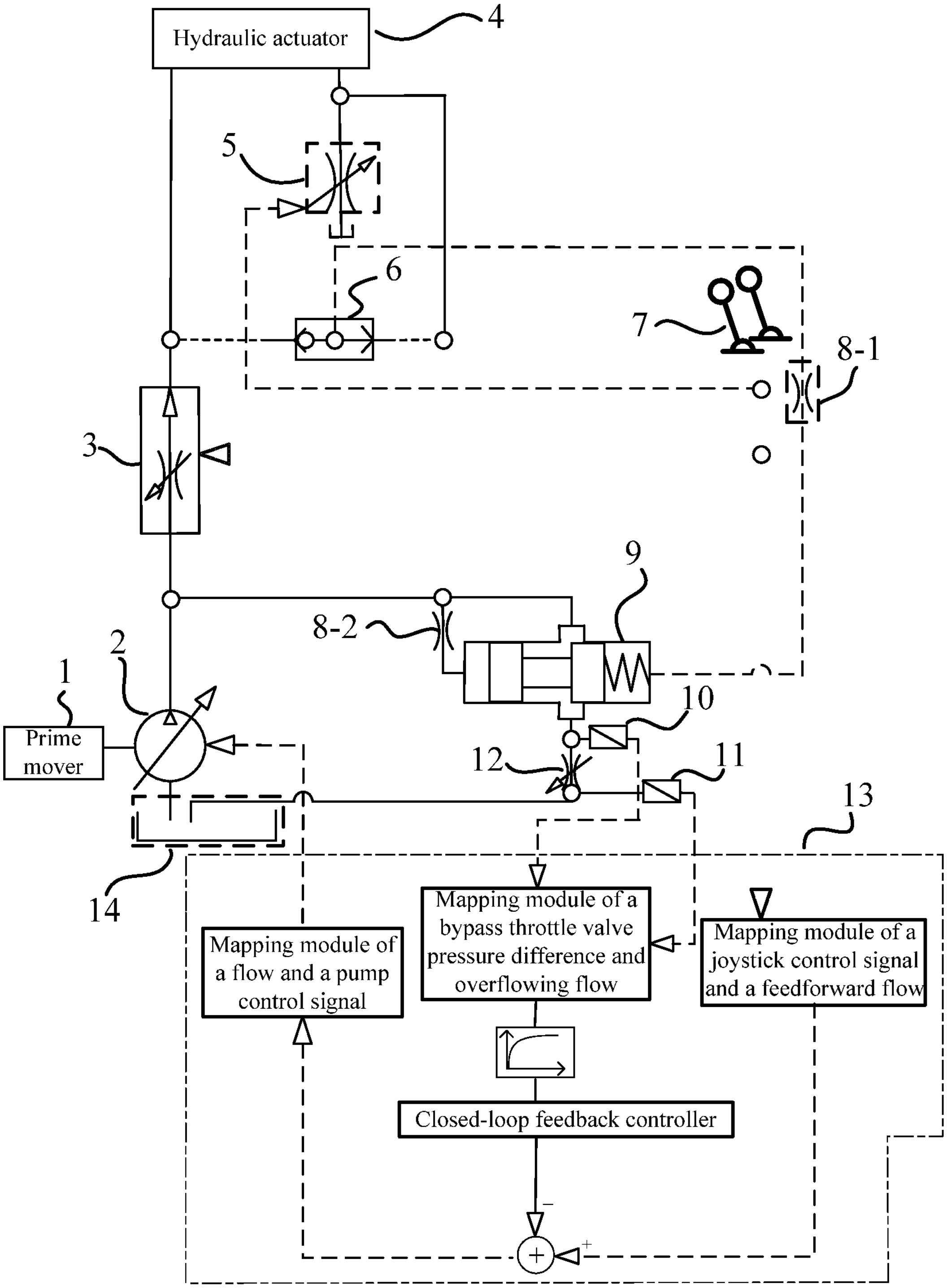
FIG. 9 is a schematic diagram of a system principle of Embodiment 2 of a flow self-compensating load sensing pump/valve coordinated electro-hydraulic system according to the present disclosure.

FIG. 9 is a schematic diagram of a second implementation of a flow self-compensating load sensing pump/valve coordinated electro-hydraulic system. The system includes a prime mover 1, an electronically controlled variable pump 2, a flow control valve 3, a hydraulic actuator 4, a throttle valve 5, a shuttle valve 6, an electronic control joystick 7, a damping valve 8, a bypass control valve 9, a first pressure sensor 10, a second pressure sensor 11, a bypass throttle valve 12, a control system 13, an oil tank 14. An oil outlet of the electronically controlled variable pump 2 is connected to an oil inlet of the flow control valve 3. An oil outlet of the flow control valve 3 is connected to the hydraulic actuator 4. The electronically controlled variable pump 2 supplies hydraulic oil to the hydraulic actuator 4 by using the flow control valve 3. An oil outlet of the hydraulic actuator 4 is connected to an oil inlet of the throttle valve 5. An oil outlet of the throttle valve 5 is connected to the oil tank 14. One end of the shuttle valve 6 is connected to an oil inlet of the hydraulic actuator 4, and the other end is connected to the oil outlet of the hydraulic actuator 4. The shuttle valve 6 feeds back the maximum load pressure in that of the hydraulic actuator to the right spring chamber of the bypass control valve 9 by using the damping valve 8. The left chamber of the bypass control valve 9 is connected to the oil outlet of the electronically controlled variable pump 2 by using the damping valve 8. The oil outlet of the bypass control valve 9 is connected to the oil inlet of the bypass throttle valve 12. The oil outlet of the bypass throttle valve 12 is connected to the oil tank 14. The oil inlet and the oil outlet of the bypass throttle valve 9 are correspondingly provided with the first pressure sensor 10 and the second pressure sensor 11. The electronic control joystick 7 is connected to the flow control valve 3, the control end of the throttle valve 5, and the control system 13. The control system 13 generates the control signal of the electronically controlled variable pump by receiving the control signal of the electronic control joystick 7 and pressure signals of the first pressure sensor 10 and the second pressure sensor 11. The control signal of the electronically controlled variable pump is transmitted to the electronically controlled variable pump for further adjusting the swing angle of the swash plate, so as to precisely control the displacement of the electronically controlled variable pump 2.

Different from the embodiment shown in FIG. 1, there is only one hydraulic actuator 4 in the embodiment shown in FIG. 9. In the embodiment shown in FIG. 9, the shuttle valve 6 screens out the maximum load pressure at two ends of the oil outlet and the oil inlet of the hydraulic actuator 4, feeds back the maximum load pressure to the spring chamber of the bypass control valve 9 by using the damping valve 8, and controls movement of the valve core of the bypass control valve 9 according to the relationship between the pressure margin of the system and the spring preset value, to control the flow of the system effused by using the bypass control valve 9.

A control method in the embodiment shown in FIG. 9 is the same as the control method in the embodiment shown in FIG. 1 and FIG. 8.

Embodiment 3

Figure 10:
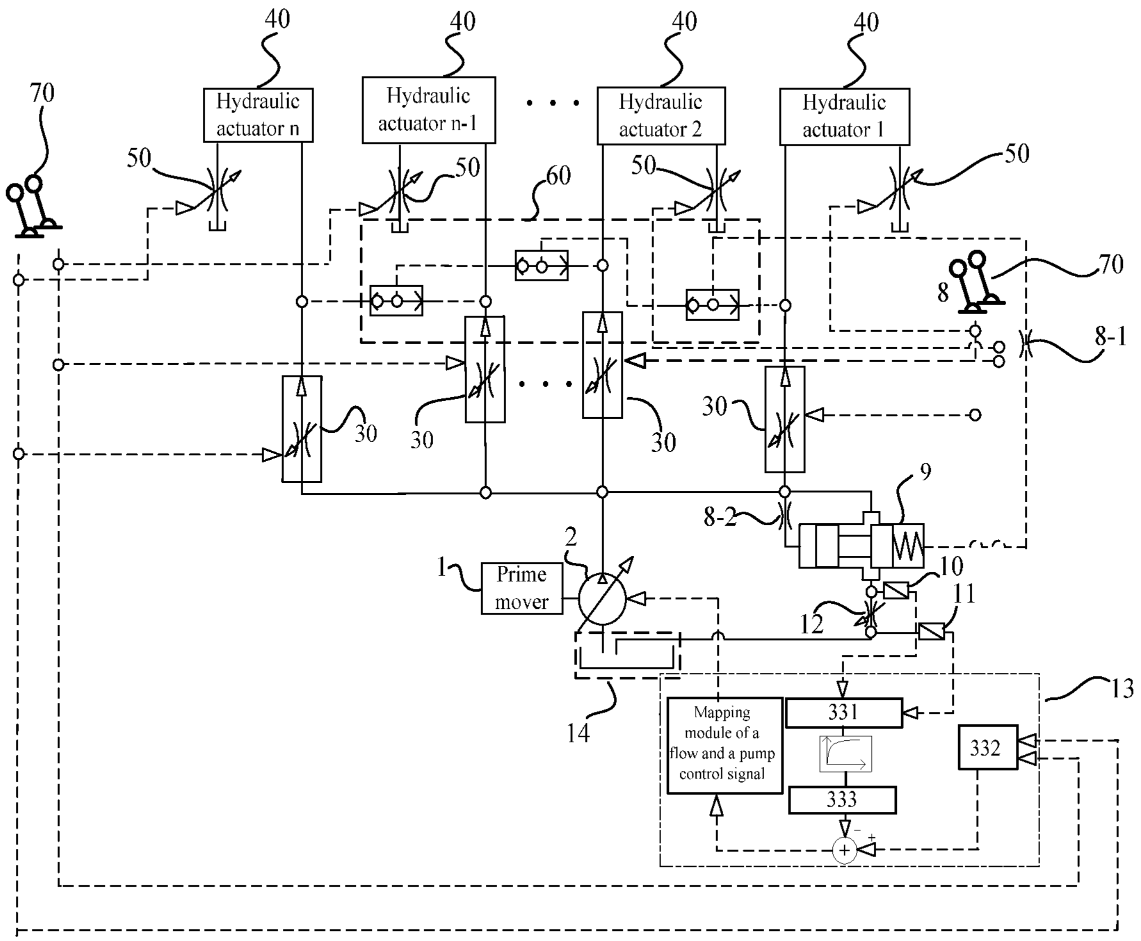
FIG. 10 is a schematic diagram of a system principle of Embodiment 3 of a flow self-compensating load sensing pump/valve coordinated electro-hydraulic system according to the present disclosure.

FIG. 10 is a schematic diagram of a third implementation of a flow self-compensating load sensing pump/valve coordinated electro-hydraulic system. The system includes a prime mover 1, an electronically controlled variable pump 2, several flow control valves 30 (N flow control valves 30 shown in FIG. 10), several hydraulic actuators 40 (N hydraulic actuators 30 shown in FIG. 10), several throttle valves 50 (N throttle valves 50 shown in FIG. 10), a shuttle valve group 60, several electronic control joysticks 70, a first damping valve 8-1, a second damping valve 8-2, a bypass control valve 9, a first pressure sensor 10, a second pressure sensor 11, a bypass throttle valve 12, a control system 13, an oil tank 14. The oil outlet of the electronically controlled variable pump 2 is connected to the oil inlet of the flow control valve 30. The oil outlet of the flow control valve 30 is connected to the hydraulic control valve 40. The electronically controlled variable pump 2 supplies hydraulic oil to the hydraulic actuator 40 by using the flow control valve 30. The oil outlet of the hydraulic actuator 40 is connected to the oil inlet of the throttle valve 50. The oil outlet of the throttle valve 50 is connected to the oil tank 14.

Specifically, the shuttle valve group 60 includes several shuttle valves ((N−1) shuttle valves shown in FIG. 10). A first shuttle valve is connected to oil inlets of two initial neighboring hydraulic actuators (namely, the first hydraulic actuator and second hydraulic actuator) in the hydraulic actuators 40, to screen out the maximum load pressure in those of the two hydraulic actuators. The first shuttle valve outputs, by using an oil outlet, the maximum load pressure in those of the two hydraulic actuators to one end of an oil inlet of the second shuttle valve. The other end of the oil inlet of the second shuttle valve is connected to an oil inlet of the third hydraulic actuator, to screen out the maximum load pressure in those of the three hydraulic actuators. By analogy, the shuttle valve group 60 screens out the maximum load pressure in those of multiple hydraulic actuators, and feeds back the maximum load pressure to the right spring chamber of the bypass control valve 9 by using the first damping valve 8-1. The left chamber of the bypass control valve 9 is connected to the oil outlet of the electronically controlled variable pump 2 by using the second damping valve 8-2. The oil outlet of the bypass control valve 9 is connected to an oil inlet of the bypass throttle valve 12. The oil outlet of the bypass throttle valve 12 is connected to the oil tank 14. The oil inlet and the oil outlet of the bypass throttle valve 9 are correspondingly provided with the first pressure sensor 10 and the second pressure sensor 11. The electronic control joystick 70 is connected to the flow control valve 30, a control end of the throttle valve 50, and the control system 13. The control system 13 generates a control signal of the electronically controlled variable pump by receiving a control signal of the electronic control joystick 70 and pressure signals of the first pressure sensor 10 and the second pressure sensor 11. The control signal of the electronically controlled variable pump is transmitted to the electronically controlled variable pump for further adjusting the swing angle of the swash plate, so as to precisely control a displacement of the electronically controlled variable pump 2.

Different from the embodiments shown in FIG. 1 and FIG. 9, there are more than three hydraulic actuators (n hydraulic actuators shown in FIG. 10) in the embodiment shown in FIG. 10, multiple shuttle valves are correspondingly added, and the multiple shuttle valves are included in the shuttle valve group 60. In the embodiment shown in FIG. 10, the shuttle valves connected to the spring chamber of the bypass control valve 9 feedback the maximum load pressure of the multiple hydraulic actuators screened out by the shuttle valves to the spring chamber of the bypass control valve 9 by using the first damping valve 8-1, and control movement of the valve core of the bypass control valve 9 according to the relationship between the pressure margin of the system and spring preset value, to control the flow of the system effused by using the bypass control valve 9.

A control method in the embodiment shown in FIG. 10 is the same as the control method in the embodiment shown in FIG. 1 and FIG. 8.

It can be learned from Embodiment 1 and Embodiment 3 that in the present disclosure, if it is assumed that there are N flow control valves, the quantity of hydraulic actuators corresponds to N, the quantity of throttle valves corresponds to N, the quantity of shuttle valves corresponds to (N−1), and the quantity of electronic control joysticks corresponds to N. The outlet of the electronically controlled variable pump is connected to the oil inlet of each of the N flow control valves. The oil outlet of each flow control valve is connected to an oil inlet of one hydraulic actuator. The oil outlet of each of the N hydraulic actuators is connected to the oil tank. The first shuttle valve is connected to both the neighboring first hydraulic actuator and second hydraulic actuator, to screen out the maximum load pressure in those of the first hydraulic actuator and the second hydraulic actuator. The first shuttle valve outputs, by using the oil outlet, the maximum load pressure in those of the first hydraulic actuator and the second hydraulic actuator to one end of the oil inlet of a second shuttle valve. The other end of the oil inlet of the second shuttle valve is connected to an oil inlet of a third hydraulic actuator, to screen out the maximum load pressure in those of the three hydraulic actuators. By analogy, the shuttle valve group screens out a maximum load pressure in those of the N hydraulic actuators. The oil outlet of each of the (N−1) shuttle valves is connected to the right spring chamber of the bypass control valve. The left chamber and an oil inlet of the bypass control valve are both connected to the oil outlet of the electronically controlled variable pump. The oil outlet of the bypass control valve is connected to the oil inlet of the bypass throttle valve. The oil outlet of the bypass throttle valve is connected to the oil tank. The oil inlet and the oil outlet of the bypass throttle valve are correspondingly provided with the first pressure sensor and the second pressure sensor. Each electronic control joystick is correspondingly connected to the control end of one flow control valve. The N electronic control joysticks are further connected to the control system. The control system generates the control signal of the electronically controlled variable pump by receiving control signals of the N electronic control joysticks and pressure signals of the first pressure sensor and the second pressure sensor. The control signal of the electronically controlled variable pump is transmitted to the electronically controlled variable pump.

Finally, it should be noted that the above embodiments are only intended to explain, rather than to limit the technical solutions of the present disclosure. Although the present disclosure is described in detail with reference to the preferred embodiments, a person of ordinary skill in the art should understand that modifications or equivalent substitutions may be made to the technical solutions of the present disclosure without departing from the objectives and scope of the technical solutions, and such modifications or equivalent substitutions should be included within the scope of the claims of the present disclosure.

The invention claimed is:

1. A flow self-compensating load sensing pump/valve coordinated electro-hydraulic system, comprising a prime mover, an electronically controlled variable pump, a flow control valve, and a hydraulic actuator, wherein the prime mover is configured to drive the electronically controlled variable pump, an oil outlet of the electronically controlled variable pump is connected to an oil inlet of the flow control valve, an oil outlet of the flow control valve is connected to an oil inlet of the hydraulic actuator, and an oil outlet of the hydraulic actuator is connected to an oil tank; and the system further comprises a throttle valve, a first damping valve, a second damping valve, a shuttle valve, an electronic control joystick, a bypass control valve, a first pressure sensor, a second pressure sensor, a bypass throttle valve, and a control system, wherein an oil inlet of the throttle valve is connected to the hydraulic actuator, an oil outlet of the throttle valve is connected to the oil tank, a control end of the throttle valve is connected to the electronic control joystick, the shuttle valve is configured to screen out a maximum load pressure of the hydraulic actuator, an oil outlet of the shuttle valve is connected to a right spring chamber of the bypass control valve by using the first damping valve, a left chamber of the bypass control valve is connected to the oil outlet of the electronically controlled variable pump by using the second damping valve, the left chamber and an oil inlet of the bypass control valve are both connected to the oil outlet of the electronically controlled variable pump, an oil outlet of the bypass control valve is connected to an oil inlet of the bypass throttle valve, an oil outlet of the bypass throttle valve is connected to the oil tank, the oil inlet and the oil outlet of the bypass throttle valve are correspondingly provided with the first pressure sensor and the second pressure sensor, the electronic control joystick is connected to a control end of the flow control valve and the control system, the control system generates a control signal of the electronically controlled variable pump by receiving a control signal of the electronic control joystick and pressure signals of the first pressure sensor and the second pressure sensor, and the control signal of the electronically controlled variable pump is transmitted to the electronically controlled variable pump.

2. The flow self-compensating load sensing pump/valve coordinated electro-hydraulic system according to claim 1, wherein the flow control valve is a hydro-mechanical flow control valve comprising a pressure compensator valve and a proportional directional valve or an electronic flow control valve controlled by using an algorithm.

3. The flow self-compensating load sensing pump/valve coordinated electro-hydraulic system according to claim 1, wherein the control system comprises a mapping module of a joystick control signal and a feedforward flow, a mapping module of a bypass throttle valve pressure difference and overflowing flow, a low-pass filter, a closed-loop feedback controller, and a mapping module of a flow and a pump control signal.

4. The flow self-compensating load sensing pump/valve coordinated electro-hydraulic system according to claim 1, wherein the prime mover is an electric motor or an engine.

5. The flow self-compensating load sensing pump/valve coordinated electro-hydraulic system according to claim 1, wherein the hydraulic actuator is a hydraulic linear cylinder or a hydraulic rotary motor.

6. A control method applied to the flow self-compensating load sensing pump/valve coordinated electro-hydraulic system according to claim 1, comprising the following steps:

step 1: transmitting, by the electronic control joystick, the control signal to a control system, and calculating, by the control system, a flow feedforward demand signal of a hydraulic system;

step 2: transmitting, by the first pressure sensor and the second pressure sensor at two ends of the bypass throttle valve, acquired pressure signals to the control system, and calculating, by the control system, a pressure difference between the two ends of the bypass throttle valve by using the pressure signals, and calculating, by using a pressure difference signal, a flow feedback compensation signal passing through the bypass throttle valve, wherein the flow feedback compensation signal is output after being processed by the control system;

step 3: making a difference between the flow feedforward demand signal of the hydraulic system and the flow feedback compensation signal, and transmitting the difference to the control system as a demand signal of an actual flow of the hydraulic system; and converting, by the control system, the demand signal of the actual flow of the hydraulic system into a displacement control signal of the electronically controlled variable pump; and step 4: using the displacement control signal of the electronically controlled variable pump to adjust a position of a variable piston by using a flow control valve, to further adjust a swing angle of a swash plate, so as to precisely control the electronically controlled variable pump.

7. A flow self-compensating load sensing pump/valve coordinated electro-hydraulic system, comprising a prime mover, an electronically controlled variable pump, N flow control valves, and N hydraulic actuators, wherein, N is an integer greater than 1, the prime mover is configured to drive the electronically controlled variable pump, an oil outlet of the electronically controlled variable pump is connected to an oil inlet of each of the N flow control valves, an oil outlet of each flow control valve is connected to an oil inlet of one hydraulic actuator, and an oil outlet of each of the N hydraulic actuators is connected to an oil tank; and the system further comprises a shuttle valve group, N electronic control joysticks, a bypass control valve, a first pressure sensor, a second pressure sensor, a bypass throttle valve, and a control system, wherein the shuttle valve group comprises (N−1) shuttle valves; a first shuttle valve is connected to both a neighboring first hydraulic actuator and a second hydraulic actuator, to screen out a maximum load pressure in those of the first hydraulic actuator and the second hydraulic actuator; the first shuttle valve outputs, by using an oil outlet, the maximum load pressure in those of the first hydraulic actuator and the second hydraulic actuator to one end of an oil inlet of a second shuttle valve; the other end of the oil inlet of the second shuttle valve is connected to an oil inlet of a third hydraulic actuator, to screen out a maximum load pressure in those of the three hydraulic actuators, and by analogy, the shuttle valve group screens out a maximum load pressure in those of the N hydraulic actuators; an oil outlet of each of the (N−1) shuttle valves is connected to a right spring chamber of the bypass control valve; a left chamber and an oil inlet of the bypass control valve are both connected to the oil outlet of the electronically controlled variable pump; an oil outlet of the bypass control valve is connected to an oil inlet of the bypass throttle valve; an oil outlet of the bypass throttle valve is connected to the oil tank; the oil inlet and the oil outlet of the bypass throttle valve are correspondingly provided with the first pressure sensor and the second pressure sensor; each electronic control joystick is correspondingly connected to a control end of one flow control valve; the N electronic control joysticks are further connected to the control system; the control system generates a control signal of the electronically controlled variable pump by receiving control signals of the N electronic control joysticks and pressure signals of the first pressure sensor and the second pressure sensor; and the control signal of the electronically controlled variable pump is transmitted to the electronically controlled variable pump.

8. The flow self-compensating load sensing pump/valve coordinated electro-hydraulic system according to claim 7, further comprising N throttle valves and a first damping valve, a second damping valve, wherein an oil inlet of each throttle valve is connected to each of the hydraulic actuators, an oil outlet of the throttle valve is connected to the oil tank, a control end of the throttle valve is connected to each of the electronic control joysticks, the oil outlet of each of the (N−1) shuttle valves is connected to the right spring chamber of the bypass control valve by using the first damping valve, and the left chamber of the bypass control valve is connected to the oil outlet of the electronically controlled variable pump by using the second damping valve.

9. The flow self-compensating load sensing pump/valve coordinated electro-hydraulic system according to claim 7, wherein each flow control valve is a hydro-mechanical flow control valve comprising a pressure compensator valve and a proportional directional valve.

* * * * *